United States Patent [19]

Masters

[11] 4,049,744
[45] Sept. 20, 1977

[54] PROCESS FOR MAKING POWDER COATINGS

[75] Inventor: John Edward Masters, Louisville, Ky.

[73] Assignee: Celanese Polymer Specialties Company, Louisville, Ky.

[21] Appl. No.: 617,480

[22] Filed: Sept. 29, 1975

[51] Int. Cl.² .............................................. C08G 59/18
[52] U.S. Cl. ..................... 260/837 R; 260/29.2 EP; 260/29.6 NR; 260/29.6 PM; 260/47 EP; 260/77.5 TB; 260/831; 260/834
[58] Field of Search ............... 260/29.6 PM, 29.2 EP, 260/29.6 NR, 47 EP, 77.5 TB, 834, 837 R, 831

[56] References Cited
U.S. PATENT DOCUMENTS

| | | | |
|---|---|---|---|
| 2,668,805 | 2/1954 | Greenlee et al. | 260/47 EP |
| 2,811,495 | 10/1957 | Witcoff et al. | 260/29.2 EP |
| 2,872,427 | 2/1959 | Schroeder | 260/29.2 EP |
| 2,899,397 | 8/1959 | Aelony et al. | 260/29.2 EP |
| 3,561,003 | 2/1971 | Lanham et al. | 260/29.2 EP |
| 3,586,654 | 6/1971 | Lerman et al. | 260/41 |
| 3,879,324 | 4/1975 | Timmons et al. | 260/29.2 EP |
| 3,908,049 | 9/1975 | Fitko | 260/29.2 EP |

*Primary Examiner*—Eugene C. Rzucidlo
*Attorney, Agent, or Firm*—Herbert P. Price; K. A. Genoni; T. J. Morgan

[57] ABSTRACT

Powder coating compositions are prepared by first forming a dispersion in water of a complex polyhydroxy polyether resin using as the dispersant an inorganic or organic base salt of a polymeric carboxylic acid having an acid value before salting of at least 50, acidifying the dispersion and then isolating and drying the precipitated fine particle size resin. Such resins in this finely divided form find particular utility as powder coatings for metallic articles.

17 Claims, No Drawings

PROCESS FOR MAKING POWDER COATINGS

BACKGROUND OF THE INVENTION

The field of art to which this invention pertains is powder coatings made from aqueous dispersions of epoxy resins or polyethers derived therefrom and to the process for making such powder coatings.

Various methods have been proposed for making finely divided resin compositions. For instance, in U.S. Pat. No. 3,422,049, it has been proposed that normally solid synthetic organic polymeric thermoplastic resins be subjected to vigorous agitation in the presence of water and a block copolymer of ethylene oxide and propylene oxide as a dispersing agent, at a temperature above the point of the resin, and at a pressure sufficient to maintain water in the liquid state until a dispersion is produced with the polymer reduced to a finely divided particle form, after which the dispersion is cooled below the melting point of the resin. The resin particles are then recovered from the dispersing medium.

Processes similar to that proposed in U.S. Pat. No. 3,422,049 are disclosed in U.S. Pat. No. 3,586,654 and 3,674,736.

According to U.S. Pat. No. 2,945,020 finely divided polyethylene powders are prepared by agitating polyethylene in a solvent-nonsolvent mixture at a temperature below the melting point of the polyethylene for a time sufficient to form fine particles.

Another process for making finely divided polyethylene using a solvent-nonsolvent mixture is proposed in U.S. Pat. No. 3,244,687. In this process, the polyethylene is dissolved in a solvent-nonsolvent mixture wherein the nonsolvent has a higher boiling point than the solvent. The solvent is distilled off leaving the polyethylene dispersed in the nonsolvent.

In Canadian Pat. No. 970,494 pigmented polymer particles are prepared by emulsifying a film forming resin in a continuous phase above the melting point of the resin, adding pigment, cooling the emulsion below the melting point of the resin and recovering the solid pigmented resin particles.

Canadian Pat. No. 900,069 discloses a process for making dispersions of epoxy, polyamide and alpha-substituted styrene resins using monomeric anionic, non-ionic and cationic surfactants as dispersing aids.

SUMMARY OF THE INVENTION

This invention pertains to finely divided or powdered resinous compositions and to processes for preparing same. In particular this invention relates to methods for preparing finely divided epoxy resins or polyethers derived therefrom.

By the process of this invention, finely divided particles of film forming resins are prepared, which particles can be formulated into thermosetting coating compositions. Said finely divided particles are uniform in size, spherical in shape with a particle size distribution of about 1 to about 50 microns.

In the process of this invention, finely divided particles of film forming resins are prepared by (1) mixing at a temperature of at least 60° C. an epoxy resin or polyether derived therefrom having a melting point greater than 80° C. with water having dissolved or dispersed therein an inorganic or organic base salt of a polymeric polycarboxylic acid, said acid having an unsalted acid value of at least about 50, wherein said polymeric salt is present in the amount of about 1 to about 25% by weight based on the weight of said resin; (2) agitating the mixture to form a dispersion having a particle size of about 1 to about 50 microns; (3) reducing the solids content of the dispersion with water; (4) cooling the dispersion below the melting point of the resin in the dispersed phase; (5) acidifying the dispersion; and (6) recovering the dispersed particles.

The process for conducting the dispersion steps of this invention is similar to that described in my copending patent application, Ser. No. 551,884, filed Feb. 21, 1975 (now abandoned).

DESCRIPTION OF THE INVENTION

The epoxy resins or polyether resins derived therefrom, which are dispersed and finely divided by the process of this invention, are complex polyhydroxy polyether resins containing alternating aromatic and glyceryl nuclei linked through ether oxygens. These resins can be terminated with epoxy (glycidyl) groups, phenolic groups, hydroxyalkyl groups, alkyl or aryl ester groups and alkyl or aryl ether groups. Such resins useful in the process of this invention are those which have a Durrans melting point of at least about 80° C. Preferably the melting point of the resin is about 80° to about 150° C., and most preferably about 90° C. to about 135° C.

The complex polyhydroxy polyether resins useful in this invention are derivatives of epihalohydrins and dihydric phenols reacted in various ratios and with or without modifying compounds. The epihalohydrins are epichlorohydrin, epibromohydrin and epiiodohydrin with epichlorohydrin being preferred. The dihydric phenols include resorcinol, hydroquinone, p,p'-dihydroxydiphenyl propane (bisphenol A), 4,4'-dihydroxy benzophenone, 4,4'-dihydroxy biphenyl, p,p'-dihydroxydiphenyl sulfone and the like. The most preferred phenol is p,p'-dihydroxydiphenyl propane or bisphenol A as it is commonly called.

The complex polyhydroxy polyether resins which are terminated with epoxy groups are made by reacting a molar excess of epihalohydrin with a dihydric phenol as described in U.S. Pat. No. 2,615,007, or a molar excess of a diglycidyl either of a dihydric phenol with additional dihydric phenol as described in U.S. Pat. No. 2,615,008. The molecular weight, melting point and epoxide equivalent weight of such resins can be varied over a wide range by varying the ratio of epihalohydrin or diepoxide to dihydric phenol as is well known in the art. Phenolic terminated complex polyhydroxy polyether resins are made by reacting a molar excess of dihydric phenol with the epihalohydrin or diepoxide as described in U.S. Pat. No. 2,668,805.

Complex polyhydroxy polyether resins containing epoxide termination can also be reacted with a monocarboxylic acid to produce an ester terminated polyhydroxy polyether. Monocarboxylic acids containing 1 to 24 carbon atoms, such as formic acid, acetic acid, propionc acid, 2-ethylhexoic acid, oleic acid, lauric acid, palmitic acid, stearic acid, lignoceric acid and the like, can be used. Generally, the amount of acid used will be equivalent to the epoxide content of the resin and the reaction is conducted under such conditions as to bring about carboxy-epoxy reaction but not carboxy-hydroxy reaction. The complex polyhydroxy polyether resins containing epoxide termination can also be ether terminated by reacting the epoxide groups with monohydric phenols and monohydric alcohols under conditions well known in the art.

Hydroxyalkyl ether terminated complex polyhydroxy polyether resins can be made by the procedure described in U.S. Pat. No. 2,558,949 wherein a dihydric phenol is reacted with an epihalohydrin and a monochlorohydrin. Such terminated products can also be obtained by a two step process wherein a phenolic terminated polyhydroxy polyether resin is first made followed by reaction with a monochlorohydrin or a monoepoxide, examples of which include ethylene chlorohydrin, glyceryl monochlorohydrin, propylene chlorohydrin, ethylene oxide, propylene oxide, glycidol, phenyl glycidyl ether, butyl glycidyl ether and the like.

Ester terminated polyhydroxy polyether resins can also be made by reacting a diepoxide, a diphenol and a monocarboxylic acid in the ratio of $n + 1$ mols of diepoxide, $n$ mols of diphenol and 2 mols of monocarboxylic acid as described in U.S. Pat. No. 3,247,136. By modifying the above procedure using $n$ mols of diepoxide, $n$ mols of diphenol and 1 mol of monocarboxylic acid, a polyhydroxy polyether resin containing phenolic termination and ester termination can be made.

The preferred polyhydroxy polyether resin is a bisphenol A, epichlorohydrin reaction product containing phenolic termination and having a Durrans melting point of about 90° to about 130° C.

The dispersant which is used in the process of this invention is an inorganic or organic base salt of a polymeric carboxylic acid having an acid value of at least about 50 up to about 150 before salting. Preferably the acid will be in the range of about 60 to about 110. If the acid value of the polymeric acid is above 150, coatings made from the products of this invention are more water sensitive and require a dispersant level approximately that required for a lower acid value dispersant. The molecular weight of the dispersant combined with the acid value should be such that the salt of the product is soluble or colloidally dispersible in water, or water with a water miscible cosolvent, at the temperatures employed in the dispersion process. Useful molecular weights are those conventionally obtained in polymerization processes using free radical catalysts. Such molecular weights will vary from about 1000 to about 100,000, and, preferably, from about 20,000 to about 50,000.

The preferred polymeric carboxylic acid to be used in this invention is a copolymer of polymerizable ethylenically unsaturated carboxylic acids and monomers copolymerizable therewith. Examples of such unsaturated acids are acrylic acid, methacrylic acid, crotonic acid, itaconic acid, maleic acid or its anhydride, fumaric acid, and half acid esters of maleic and fumaric acid formed with alcohols containing one to about 18 carbon atoms, e.g., methyl acid fumarate, butyl acid maleate, octyl acid maleate and the like. The preferred acids are acrylic and methacrylic acids.

The other monomers which are utilized with the polymerizable acids are any ethylenically unsaturated monomers which are copolymerizable with the polymerizable acids. Examples of such monomers are alkyl acrylates and methacrylates wherein the alkyl group contains 1 to 18 carbon atoms, e.g., methyl acrylate or methacrylate, ethyl acrylate or methacrylate, butyl acrylate or methacrylate, 2-ethylhexyl acrylate or methacrylate, lauryl acrylate or methacrylate, stearyl acrylate or methacrylate, and the like. Included with the alkyl acrylates and methacrylates are the hydroxyalkyl esters, e.g., hydroxyethyl acrylate or methacrylate, hydroxypropyl acrylate or methacrylate, hydroxybutyl acrylate or methacrylate, etc., as well as aryl esters, i.e., benzyl acrylate or methacrylate, etc. Preferred monomers of this class are ethyl acrylate, hydroxyethyl acrylate and hyroxypropyl acrylate.

Examples of additional monomers which can be utilized to form the polymeric carboxylic acids are styrene, vinyl toluene, vinyl naphthalene, acrylonitrile, methacrylonitrile, ethylene, propylene, acrylamide, and methacrylamide. Preferred monomers in this class are styrene and vinyl toluene.

The copolymers of polymerizable acids can be prepared by any of the well known procedures used for vinyl and acrylic polymerization, e.g., bulk polymerization, solution polymerizations, suspension polymerization and emulsion polymerization using free radical catalysis.

The preferred copolymers are copolymers of acrylic or methacrylic acid. The amount of acid incorporated into the copolymer is dependent, of course, upon the desired acid value. To obtain an acid value of 50, the minimum amount specified for the dispersant, 6.4 weight percent acrylic acid, or 7.66 weight percent methacrylic acid, is needed in the copolymer.

A particularly preferred polymeric carboxylic acid is made from about 55 to about 65% by weight ethyl acrylate, about 25 to about 38% by weight styrene and about 7 to about 15% by weight of acrylic acid or 8 to 20% by weight methacrylic acid.

To form the dispersant, the polymeric carboxylic acid is salted with an organic or inorganic base, e.g., sodium or potassium hydroxide, ammonium hydroxide, or an amine. Useful amines are those which have amine equivalent weight of less than about 150, and can be primary, secondary, or tertiary. Examples of amines are ethylamine, propylamine, diethylamine, dipropylamine, triethylamine, tributylamine, morpholine, piperidine, piperazine, ethanolamine, diethanolamine, triethanolamine, diemethylamino ethanol, ethylene diamine, diethylene triamine, and the like.

As stated hereinbefore, the polymeric carboxylic acid should have an acid value of at least about 50, i.e., an acid value which is sufficient to render the base salt of the polymer water soluble or at least colloidally dispersible in water. The number of carboxylic acid groups which must be salted will depend to a large extent on the acid value of the polymeric itself. For examples, a copolymer which has an acid value of 50 may require full neutralization, while a material having an acid value of 150 may require only partial neutralization. In any event, it is necessary that enough acid sites be present and neutralized to assure water solubility or colloidal dispersibility.

The amount of polymeric carboxylic acid used in the process of this invention is about 1 to about 25 percent by weight based on the weight of the polyhydroxy polyether resin and preferably about 3 to about 10 percent.

Additional components which can be used in the process of this invention are protective colloids added in the amounts of about 0.1 to about 5 percent by weight based upon the total solids weight of the dispersion. Examples of useful protective colloids are starch, casein, gelatin, alginates, pectinates, methyl cellulose, hydroxyethyl cellulose, carboxymethyl cellulose, polyvinyl alcohol, sodium or ammonium salts of linear or partially crosslinked acrylic or methacrylic acids, and the like.

Curing agents for the polyhydroxy polyethers used in the process of this invention can be added during the dispersion process, after the dispersion has been formed or, in some cases, can be blended with the powdered resin after it has been isolated from the dispersed phase. If added during the dispersion process, the curing agents must be nonreactive with the polyhydroxy polyether resin at the processing temperature. Examples of such curing agents are amino resins which are the reaction products of ureas and melamines with aldehydes further etherified in some cases with an alcohol. Examples of amino resin components are urea, ethylene urea, thiourea, melamine, benzoguanamine and acetoguanamine. Aldehydes useful in this invention include formaldehyde, acetaldehyde and propionaldehyde. Tha amino resins can be used in the alkylol form but, preferably, are utilized in the ether form wherein the etherifying agent is a monohydric alcohol contaning from 1 to about 8 carbon atoms. Examples of amino resins are methylol urea. dimethoxymethylol urea, butylated polymeric urea-formaldehyde resins, hexamethoxymethyl melamine, methylated polymeric melamine-formaldehyde resin and butylated polymeric melamine-formaldehyde resin. If the amino resin is added during the dispersion process, it can be water soluble or water insoluble. If post-added, water soluble resins are added simply by blending and dissolving them into the aqueous dispersion medium. Water insoluble resins can be added to the dispersions as an aqueous dispersion. It is important that the amino resins be of sufficient molecular weight or have a high enough melting point so that the resulting powder is non-sintering and free flowing at ambient temperatures. Amino resins are utilized in the amount of about 5 to about 40 percent by weight based on the weight of the polyhydroxy polyether resin.

Additional curing agents which can be used in this invention are blocked polyisocyanates, i.e., polyisocyanates which have their isocyanate groups reacted with a blocking agent which will unblock at the curing temperature to yield free isocyanate groups which can then react with the hydroxy groups of the polyhydroxy polyether resin. Examples of useful polyisocyanates are aromatic and aliphatic polyisocyanates, e.g., toluene diisocyanate, isophorone diisocyanate, hexamethylene diisocyanate and 4,4'-methylene bis (cyclohexyl) isocyanate) as well as polyhydric alcohol adducts of the polyisocyanates. Blocking agents include oximes, monohydric alcohols, phenol, caprolactam and the like. The blocked isocyanates can be added to the dispersion during the dispersion process providing the unblocking temperature of the particular blocked polyisocyante is above the processing temperature. The blocked polyisocyanates can also be post-added to the dispersion. The amount of blocked polyisocyanate used will be about 5 to about 40 percent by weight based on the weight of the polyhydroxy polyether resin.

If the polyhydroxy polyether resin contains glycidyl end groups, then the curing agent can be any of the well known polyamines or polyamidoamines which in combination with the polyepoxide resin result in powders which are non-sintering. Such amine curing agents must be added to the dispersions after the dispersions have been formed in order to prevent gelation during processing. The curing agents if water soluble, are dissolved in the aqueous phase of the dispersion. If water soluble, they are dispersed in the aqueous phase.

Curing agents can also be added to the powdered resin after it has been isolated from the continuous dispersion phase. Examples of such curing agent include those discussed above as well as dicyandiamide, solid epoxide resin-amine adducts, solid phenol-formaldehyde resins, solid polycarboxylic acid anhydrides, solid acrylic acid copolymers and the like.

By the process of this invention aqueous dispersion of complex polyhydroxy polyether resins are prepared by mixing at a temperature of about 60° to about 120° C. the resin with water having dissolved or dispersed therein a dispersant which is an inorganic or organic base salt of a polymeric carboxylic acid, agitating the mixture to form a dispersion having a particle size of about 1 to about 50 microns, cooling the dispersion below the melting point of the resin, acidifying it and recovering the dispersed particles. In one variation of this process, the complex polyhydroxy polyether resin is heated to its molten stirrable state, an aqueous solution of the dispersant is slowly added to the molten resin with agitation, agitation is continued until a dispersion of the desired particle size is obtained, and the dispersion is then reduced with water to the desired solids content and cooled. If the softening or melting point of the resin is extemely high, a small amount, up to about 10 percent by weight, based on the weight of the resin, of a solvent for the resin can be added. Such solvents can be water soluble or water insoluble. Examples of such solvents are ethylene glycol monomethyl ether, ethylene glycol monoethyl ether, ethylene glycol monoethyl ether acetate, diethylene glycol monobutyl ether, xylene, toluene and the like. If a curing agent is to be incorporated into the dispersion, depending on the dispersing temperature and the reactivity of the curing agent, it can be added at the molten resin stage, at the "taffy" stage, i.e., when water and molten resin are first mixed, or at any stage during the agitating and dispersing steps.

In another variation, the polyhydroxy polyether resin, either in molten form or crushed to a fine size, 8 to 20 mesh, U.S. Standard Sieve, can be slowly added to a heated (temperature range of about 60° to about 100° C.) agitated aqueous solution of the dispersant. Agitation and heating are then continued until the desired particle size dispersion is obtained.

In still another variation, a small amount of the resin can be heated above its melting point and then "taffied" with water and dispersant. The remainder of the resin can then be added in crushed form, followed by heating and agitation to form the dispersion.

Complex polyhydroxy polyether resins can be prepared, as described in U.S. Pat. No. 2,615,007, by reacting epichlorohydrin with an aqueous solution of the sodium salt of a dihydric phenol. After the condensation and dehydrohalogenation reaction is completed, the salt of reaction is washed out by a "taffy" wash process. After all the salt is removed, the "taffy" is then heated to drive out the water and dry the resin. At the taffy stage, dispersant and water can be added to the "taffy" to form the dispersion of this invention, thus avoiding a costly drying step.

In order to operate at temperatures above the boiling point of water, the process of this invention can be conducted under pressure. However, it is preferred to carry out the reaction at atmospheric pressure and, therefore, at an upper temperature limit of 100° C.

In carrying out the process of this invention, the first stage of the dispersion, i,e., the stage before reduction to the final product, is conducted at a solids content of about 65 to about 82% by weight based on the total weight of the dispersion at that stage, and preferably at a solids content of 75 to 80% by weight. After the desired particle size of the dispersion is obtained, the dispersion is reduced to a solids content, based on the total weight of the dispersion, below about 55% by weight. The lower reduction limit will vary depending upon the desired viscosity in the final product, the particle size of the dispersed phase, the presence or absence of protective colloid and the amount of protective colloid. Generally, the solids content is not reduced below 20% by weight. Preferably, the solids content will vary between about 40 and about 50% by weight based on the weight of the dispersion.

In order to isolate the finely divided resin particles, organic or inorganic acids are added to the dispersion to a pH of 7 or below. Any of the well known acids can be used in this stage, e.g., acetic acid, propionic acid, toluene sulfonic acid, sulfuric acid, phosphoric acid, hydrochloric acid and the like. A particularly preferred acid is phosphoric acid. Sufficient acid is added to reduce the pH to about 1 to about 7 and preferably about 3 to about 6. After the acid addition, the dispersed particles can be isolated by filtration, centrifugation, spray drying or other means. To facilitate filtration or centrifuging, the pH of the system should be reduced to a range of about 3 to about 4. If the product is to be spray dried, the pH need only be reduced to about 6 to about 7. The filtered or centrifuged product is air dried at ambient temperature up to about 50° C. to a solids content of at least 90%.

The powder coatings of this invention can be formulated into clear coatings or pigmented coatings. Pigments are preferably added during the dispersion processing steps or to the completed dispersion using well known formulating techniques.

Finely divided silicas, e.g., fumed silica, can be added to the powders to prevent caking. Dyes, pigments, flow-control agents and the like can be added to the powders. However, in most cases such additives are added to the system during the dispersion step.

The powder coatings obtained by the process of this invention have particle sizes in the range of 1 to 50 microns and preferably 1 to 15 microns. Such powder coatings can be applied to substrates by air and airless spraying, electrostatic spraying, fluidized bed and the like. The coatings can be coalesced and cured by heating them at a temperatudre of 125 to 300° C. for times within the range of 1 hour to 30 seconds. The powder coatings of this invention are particularly useful as coatings for the interior of aluminum, tin coated and tin free steel cans. Thin coatings of 0.2 to 0.5 mils are required and desired for interior can coatings. Such coatings can be obtained from the powders of this invention which are uniform in size distribution, are spherical and can be made into very fine particles.

The following examples describe the process of this invention in detail. Parts and percentages where used unless otherwise designated are parts and percentages by weight.

EXAMPLE 1

Part A

Dispersant Solution

To a suitable reactor equipped with a mechanical agiatator, thermometer, reflux condenser and dropping funnel were added 811.8 parts of the monobutyl ether of diethylene glycol and 178.2 parts of cumene hydroperioxide. To the dropping funnel were added 742.3 parts of styrene, 1782 parts of ethyl acrylate and 445.7 parts of methacrylic acid. Agitation was begun followed by the addition of 650 parts of the monomer mixture to the reactor. Heat was applied raising the temperature to 129° C. Slow addition of the remaining monomers was begun and completed over a period of 6 hours and 45 minutes while keeping the temperature between 122° and 128° C. Heating at 128° to 139° C. was continued for an additional hour and 10 minutes. The polymeric product had a solids content of 77.6%, an acid value of 91.2 on solids basis, and a Gardner-Holdt viscosity at 25° C. of O-P at 40% solids in the monobutyl ether of diethylene glycol.

A dispersant solution was made from 2408 parts of the above polymer solution, 325 parts of ammonium hydroxide (28% $NH_3$ in water) and 1963 parts of deionized water. The dispersant solution had a pH of 8.6.

Part B

Protective Colloid Solution

To a suitable container were added 4950 parts of deionized water. With constant agitation 50 parts of Carbopol 941 water soluble resin obtained from B. F. Goodrich Company (a polyacrylic acid slightly cross-linked with polyallyl sucrose as described in U.S. Pat. No. 2,909,402 and having an equivalent weight of 75, a specific gravity of 1.41 and a pH of 3, 1% in water) were slowly added. When well mixed, 50 parts of ammonium hydroxide (28% $NH_3$ in water) were added slowly with mixing. The resulting viscous solution, which had a pH of 8.6, was strained through an 80 mesh nylon bag and stored in a glass container.

Part C

Dispersion Preparation

To a suitable reactor equipped with a temperature recording device and a mechanical agitator were added 370 parts of a glycidyl ether of bisphenol A having a melting point of 130° C. and an epoxide equivalent weight of 1800, 16 parts of ethylene glycol monomethyl ether and 8 parts of 2,2,4-trimethyl-1,3-pentanediol monoisobutyrate. Heat was applied raising the temperature to 146° C. to melt out the glycidyl ether resin. When the resin was melted, the temperature was lowered to 114° C. and 30 parts of hexamethoxymethyl melamine at 77° C. were added. The temperature was then lowered to 102° C. and a mixture of 45 parts of the dispersant solution described in Part A, 8 parts of octyl phenoxy polyethoxy ethanol and 32 parts of deionized water at 69° C. was added slowly over a 14 minute period, the temperature dropping to 95° C. during the addition. Agitation was continued while 80 parts of the protective colloid solution described in Part B at 74° C. were added over a 3 minute period, the temperature dropping to 78° during this addition. After 5 minutes agitation, the resulting dispersed particles were elongated particles with a distribution size of about 5 to 50 microns. Agitation was discontinued for 5 minutes. Under microscopic examination, the particles were round with a particle size distribution of about 5 to 15 microns. Agitation at reduced speed was continued and 226 parts of deionized water were added over an 8 minute period with the temperatudre dropping to 54° C. The resulting dispersion was filtered through an 80 mesh nylon bag and stored. The dispersion had a solids content of 49.8%, a viscosity at 25° C, of 26 seconds on a #4 Ford Cup and a pH of 8.15. The particle size distribution was approximately 10% at 20-30 microns, 70% at 10-20 microns, 15% at 5-10 microns and 5% less than 5 microns.

Part D

Powder Preparation

A portion of the dispersion described in Part C was diluted with an equal portion of deionized water. Phosphoric acid (5% in water) was added with stirring to a pH of 3.2. The resulting slurry was then centrifuged in a basket centrifuge to remove the supernatant liquid. The filter cake was then washed with water approximately equal in volume to the original portion used for dilution. The filter cake was spun dry and was spread out in a thin layer to air dry. After drying for two days, a portion of the powder was tumbled in a pebble mill half full of pebbles for 30 minutes. The powder was then brushed through a 325 mesh (U.S. Standard) sieve. 98% passed through the screen. The sieved powder was electrostatically sprayed onto steel panels at film thickness of 0.24, 0.39 and 0.51 mil. After baking for 2 minutes at 288° C., the films were well curved, exhibiting excellent adhesion to the substrate, excellent flexibility and good solvent resistance.

EXAMPLE 2

To a suitable reactor equipped as described in Example 1 were added 27.75 parts of a glycidyl ether of bisphenol A having a melting point of 130° C. and an epoxide equivalent weight of 1800, and 18.5 parts of a glycidyl ether of bisphenol A having a melting point of 80° C. and an epoxide equivalent weight of 600. Ethylene glycol monomethyl ether, 1.25 parts, was added. Heat was applied raising the temperature to 138° to melt the glycidyl ether resins. Agitations was begun and the temperature was lowered to 113° C. where 3.75 parts of hexamethoxymethyl melamine at 80° C. were added. At a temperature of 103° C., a dispersant mixture of 0.25 part of sodium benzene sulfonate, 5 parts of the dispersant solution described in part A of Example 1 and 4 parts of deionized water was added slowly over 3 minutes. 10 parts of the protective colloid solution described in part B of Example 1 were added over a 6 minute period with the temperature dropping to 86° C. After 4 minutes and at 82° C., the particle size of the dispersed particles was 2-20 microns. Four minutes later the paricle size was 2-15 microns with 90% at 5-10 microns. Four minutes later there was no change in particle size, the agitation was slowed and 45 parts of deionized water was added over a 10 minute period. The dispersion was drawn off through an 80 mesh nylon bag filter into suitable containers. The dispersion had a solids content of 40.4%.

A portion of the dispersion was diluted with water, 2 parts to 3 of water, and was acidified to a pH of 3 with 5% aqueous phosphoric acid. The resulting slurry was centrifuged in a basket centrifuge and was washed with water in an amount approximately equal to the volume first centrifuged. The filter cake was then spread out on polyethylene film to air dry. After 48 hours at room temperature, the % solids ranged from 98.2 to 98.9%. The powder was electrostatically sprayed onto tin free steel panels at film thicknesses of 0.40 and 0.44 mil. After baking at 210° C. for 2 minutes, the coatings were well cured and exhibited at 60° gloss valves of 51 and 69 respectively. They exhibited excellent leveling, film continuity, fabrication properties, adhesion and boiling water resistance. Their solvent (methyl ethyl ketone) resistance was 94 and 100 + rubs respectively.

EXAMPLE 3

Part A

Dispersant Solution

To a suitable reactor equipped with a mechanical agitator, thermometer, reflux condenser and dropping funnel were added 547 parts of monobutyl ether of diethylene glycol and 120 parts of cumene hydroperoxide. To the dropping funnel were added 671 parts of styrene, 1137.2 parts of ethyl acrylate and 191.8 parts of methacrylic acid. Ten percent of the monomer mixture was added to the reactor and heat and agitation were applied raising the temperature to 127° C. over a period of 55 minutes. Slow addition of the remaining monomer mixture was begun and continued over a period of 5 hours and 30 minutes while keeping the temperature between 121° and 127° C. After the monomer addition was completed, the temperature was held at 121° C. for about 3 hours until a conversion of monomers to polymers of 99.6% was obtained. The polymer solution had a solids content of 75.01% and an acid value on solids basis of 61.2.

A dispersant solution was made from 892 parts of the polymer solution, 66.2 of dimethylamino ethanol and 712 parts of distilled water. This solution had a solids content of 41% and a pH of 8.3.

Part B

Dispersion Preparation

To a suitable reactor equipped as described in Example 1 were added 342 parts of the protective colloid solution described in Part B of Example 1, 166.9 parts of the dispersant solution described in Part A of this example, 156.9 parts of hexamethoxymethyl melamine, 8.7 parts of aqueous ammonium hydroxide (29.3% $NH_3$) and 9.4 parts of the monobutyl ether of ethylene glycol. Agitation was begun and heat was applied raising the temperature to 74° C. Slow addition was begun of 1481.3 parts of a crushed (8-20 mesh U.S. Standard Sieve) polyhydroxy/polyether resin made by reacting 1930.6 parts of a glycidyl ether of bisphenol A having an epoxide equivalent weight of 190 with 1569.4 parts of bisphenol A, said resin having a melting point of 119.5° C. This addition was completed in 15 minutes. Water, 70 parts, was added during the addition. When the addition was completed, 10.6 parts of aqueous ammonium hydroxide were added and the temperature was rasised to 90° C. Stirring was continued for 15 minutes at 90° C. until round particles having a particle size of 1 to 10 microns were obtained. Water, 1554 parts, was then added and stirring was continued for 12 minutes at 79° C. The temperature was then lowered to 54° C., and the dispersion was filtered through an 80 mesh nylon bag and stored in a suitable container. The dispersion had a solids content of 42.7%, a wt./gal. of 9.01 lbs. and a pH of 9.6.

Part C

Powder Preparation

A portion of the dispersion of Part B was reduced with water to about 22% solids and was acidified with 5% (aqueous) phosphoric acid to a pH of about 3 to precipitate the dispersion. The acidified dispersion was then centrifuged in a basket centrifuge to remove the supernatant liquid. The filter cake, which had a moisture content of 40–50% was spread out in thin layers to air dry. After 24 hours at room temperature, the moisture content was reduced below 2%. The dried powder was then sieved through a 325 mesh screen to remove any large particles or agglomerates.

A second portion of the dispersion of Part B after being reduced with water to about 22% solids was acidified to a pH of about 6 with 5% phosphoric acid. This acidified dispersion was then spray dried in a commercial laboratory spray drier at a chamber air temperature of about 27° to 38° C. The dried powder was then sieved through a 325 mesh screen.

The dried powder, either centrifuged or spray dried, were electrostatically sprayed onto aluminum panels to a film weight of 10–15 mg./4 sq. inches of panel and were baked at 204° C. for 5 minutes. The resulting coatings passed solvent resistance (50 double rubs of methyl ethyl ketone), continuity (1 minute in acidified copper sulfate) and water resistance (no blushing after 30 minutes submersion in water at 82° C.).

It is to be understood that the foregoing detailed description is given merely by way of illustration and that many variations may be made therein without departing from the spirit of the invention.

What is claimed is:

1. A process for preparing finely divided particles of a complex polyhydroxy polyether resin having a melting point of at least 80° C. which comprises
   a. mixing at a temperature of at least 60° C. said resin with water having dissolved or colloidally dispersed therein an inorganic or organic base salt of a polymeric polycarboxylic acid, said acid having an unsalted acid value of at least 50, wherein said polymeric salt is present at about 1 to 25 weight percent based on the weight of said resin;
   b. agitating the mixture to form a dispersion having a particle size of about 1 to about 50 microns;
   c. reducing the solids content of the dispersion with water;
   d. cooling the dispersion below the melting point of the resin;
   e. acidifying the dispersion to a pH of about 1 to about 7; and
   f. recovering the dispersed particles.

2. The process of claim 1 wherein the dispersion is formed by adding with agitation an aqueous solution of the polymeric salt to the complex polyhydroxy polyether resin wherein said resin is heated to a molten stirrable state.

3. The process of claim 1 wherein the complex polyhydroxy polyether resin in molten or granulated form is added to the heated, agitated aqueous polymeric salt solution.

4. The process of claim 1 wherein about 10 to about 25 weight percent of the complex polyhydroxy polyether resin in molten form is mixed with the aqueous polymeric salt, and to this mixture is added the remainder of the resin in granulated form.

5. The process of claim 1 wherein an amino resin is mixed with the polyhydroxy polyether resin prior to mixing with water and dispersant.

6. The process of claim 5 wherein the amino resin is hexamethoxymethyl melamine.

7. The process of claim 1 wherein the complex polyhydroxy polyether resin is a derivative of an epihalohydrin and a dihydric phenol.

8. The process of claim 7 wherein the epihalohydrin is epichlorohydrin and the dihydric phenol is p,p'-dihydroxy diphenyl propane.

9. The process of claim 8 wherein the polyhydroxy polyether resin is phenolic group terminated and has a melting point of 90° to 130° C.

10. The process of claim 1 wherein the dispersant has an acid value of 50 to 150.

11. The process of claim 1 wherein the dispersant has an acid value of 65 to 110.

12. The process of claim 1 wherein the dispersant is present in the amount of 3 to 10 weight percent based on the weight of the complex polyhydroxy polyether resin.

13. The process of claim 1 wherein a protective colloid in the amount of about 0.1 to about 5 weight percent based on the total solids weight of the dispersion.

14. The process of claim 1 wherein the dispersion is acidifed to a pH of 3 to 6.

15. The process of claim 1 wherein the dispersion is acidified with phosphoric acid.

16. The process of claim 1 wherein the dispersed particles are recovered by centrifuging.

17. The process of claim 1 wherein the dispersed particles are recovered by spray-drying.

* * * * *

UNITED STATES PATENT OFFICE
CERTIFICATE OF CORRECTION

PATENT NO. : 4,049,744
DATED : September 20, 1977
INVENTOR(S) : John Edward Masters It is certified that error appears in the above-identified patent and that said Letters Patent are hereby corrected as shown below:

```
Column  1, line 17, after "maintain", insert --the--
Column  2, line 37, before "phenol", insert --dihydric--;
           line 58, delete "pionc" and insert --pionic--
Column  4, line 47, delete "polymeric" and insert --polymer--
Column  5, line 18, delete "contaning" and insert --containing--
Column  9, line 40, after "sodium", insert --dodecyl--;
           line 56, after "parts", insert --dispersion--
Column 10, line 66, delete "phospheric" and insert --phosphoric--
Column 11, line 15, delete "powder" and insert --powders--
```

Signed and Sealed this

Sixth Day of December 1977

[SEAL]

Attest:

RUTH C. MASON
Attesting Officer

LUTRELLE F. PARKER
Acting Commissioner of Patents and Trademarks